(12) United States Patent
Van Horn et al.

(10) Patent No.: US 12,079,685 B2
(45) Date of Patent: Sep. 3, 2024

(54) SYSTEMS, METHODS, AND APPARATUSES FOR IMAGING USING A DUAL-PURPOSE ILLUMINATOR

(71) Applicant: Hand Held Products, Inc., Charlotte, NC (US)

(72) Inventors: Erik Van Horn, Mount Laurel, NJ (US); Gregory Rueblinger, Mount Laurel, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/938,438

(22) Filed: Oct. 6, 2022

(65) Prior Publication Data

US 2023/0030040 A1 Feb. 2, 2023

Related U.S. Application Data

(62) Division of application No. 17/132,897, filed on Dec. 23, 2020, now Pat. No. 11,494,576.

(51) Int. Cl.
*G06K 7/14* (2006.01)
*G06K 7/015* (2006.01)
*G06K 7/10* (2006.01)

(52) U.S. Cl.
CPC ........... *G06K 7/1456* (2013.01); *G06K 7/015* (2013.01); *G06K 7/1447* (2013.01); *G06K 2007/10504* (2013.01); *G06K 7/1413* (2013.01)

(58) Field of Classification Search
CPC .... G06K 7/1456; G06K 7/015; G06K 7/1447; G06K 7/1413; G06K 2007/10504; G06K 7/10742; G06K 7/10732; H04N 23/56; H04N 23/74
See application file for complete search history.

(56) References Cited

U.S. PATENT DOCUMENTS

| 7,204,418 B2 | 4/2007 | Joseph et al. |
| 7,942,329 B2 | 5/2011 | Pine |
| 8,632,011 B2 | 1/2014 | Gao |

(Continued)

FOREIGN PATENT DOCUMENTS

WO 2018/209580 A1 11/2018

OTHER PUBLICATIONS

DataMan Inline Barcode Verifiers, 475V Series (Cognex Corporation, Natick, MA), 8 pages. https://www.cognex.com/en-in/products/barcode-readers/barcode-verifiers/dataman-475v-series.

(Continued)

*Primary Examiner* — Matthew Mikels
(74) *Attorney, Agent, or Firm* — Alston & Bird LLP

(57) ABSTRACT

Embodiments of the disclosure relate generally to imaging devices and indicia reading devices. An imaging apparatus comprises an image sensor, an optical window positioned in front of the image sensor and a light source enclosing a perimeter of the optical window such that an illumination cone of the light source overlaps a portion of a near field of view cone of the imaging apparatus. The portion of the near field of view cone extends from a surface of the optical window to a threshold distance from the optical window. The light source is configured to produce a first illumination along a first direction extending towards a scene to be imaged.

15 Claims, 9 Drawing Sheets

(56) References Cited

U.S. PATENT DOCUMENTS

| | | |
|---|---|---|
| 8,740,078 B2 | 6/2014 | Gerst et al. |
| 9,298,960 B2 | 3/2016 | Gerst et al. |
| 2004/0112962 A1 | 6/2004 | Farrall et al. |
| 2006/0081712 A1* | 4/2006 | Rudeen .................... G06K 7/14 |
| | | 235/462.08 |
| 2007/0090193 A1 | 4/2007 | Nunnink et al. |
| 2013/0001312 A1 | 1/2013 | Kearney et al. |
| 2013/0307964 A1* | 11/2013 | Bremer .................. G06V 10/17 |
| | | 348/135 |
| 2015/0014415 A1 | 1/2015 | Gerst, III et al. |
| 2015/0193644 A1* | 7/2015 | Kearney ............ G06K 7/10564 |
| | | 235/462.06 |
| 2019/0258837 A1 | 8/2019 | Schneider et al. |

OTHER PUBLICATIONS

European search report Mailed on Apr. 28, 2022 for EP Application No. 21214635.
Final Office Action received for U.S. Appl. No. 17/132,897, mailed on Apr. 11, 2022, 9 pages.
Non-Final Office Action received for U.S. Appl. No. 17/132,897, mailed on Oct. 18, 2021, 8 pages.
Notice of Allowance received for U.S. Appl. No. 17/132,897, mailed on Jul. 6, 2022, 8 pages.
Requirement for Restriction/Election received for U.S. Appl. No. 17/132,897, mailed on Aug. 4, 2021, 7 pages.
EP Office Action Mailed on Jun. 7, 2023 for EP Application No. 21214635, 4 page(s).
Examiner Interview Summary Record (PTOL—413) Mailed on Jun. 20, 2022 for U.S. Appl. No. 17/132,897, 2 page(s).
EP Office Action Mailed on Mar. 18, 2024 for EP Application No. 21214635, 4 page(s).

\* cited by examiner

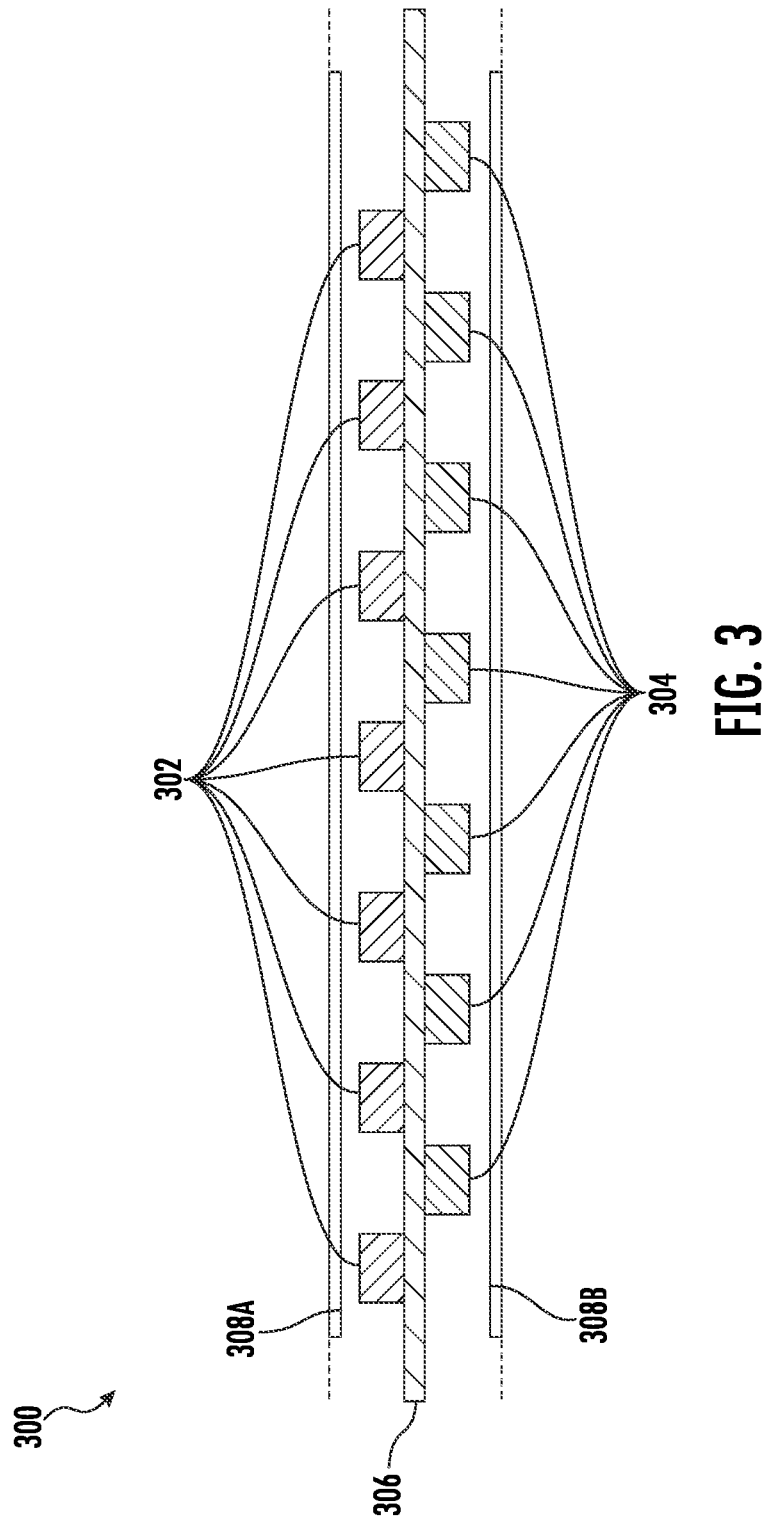

SYSTEMS, METHODS, AND APPARATUSES FOR IMAGING USING A DUAL-PURPOSE ILLUMINATOR

CROSS REFERENCE TO RELATED APPLICATIONS

This application is a divisional of U.S. application Ser. No. 17/132,897, entitled "SYSTEMS, METHODS, AND APPARATUSES FOR IMAGING USING A DUAL-PURPOSE ILLUMINATOR," filed Dec. 23, 2020, the contents of each of which are incorporated herein by reference in their entireties.

TECHNOLOGICAL FIELD

Embodiments of the present disclosure generally relate to illuminators and imaging devices, and more particularly to dual purpose illuminators providing near field illumination as well as an indication of one or more successful events related to image capture.

BACKGROUND

Imaging devices and systems have found application in areas that are more sophisticated and advanced than mere photography. There has been a constant demand for improvement in the imaging capabilities of these devices and systems to fit support the new capabilities. Due to addition of more and more components supporting new capabilities, the interference between components increases. However, most of the solutions aimed at reducing the inter-component interference result in jeopardizing performance and/or other capability of the imaging devices. In some application areas, the imaging device may be rendered ineffective with such compromised capabilities thereby reducing the versatility of applications where the imaging device may be usable.

SUMMARY

In general, embodiments of the present disclosure provided herein are configured for avoiding interference between illumination and field of view inside an imaging apparatus and enhancing imaging capabilities of the imaging apparatus. Example embodiments described and illustrated herein provide imaging devices providing improved imaging capabilities in near field of view without incurring illumination spill into the imaging sensor. Example embodiments described herein also provide an imaging apparatus having a ringed or piped illumination source that serves the dual purpose of providing illumination for imaging in the near field and providing indication of one or more successful events related to image capture and/or indicia reading. Some example embodiments are directed towards a simplified hand-held device providing an illuminator that does not lead to interference with the field of view, thereby providing sufficient illumination to subjects very close to the handheld device. Other implementations for one or more of alternative illuminators and/or alternative indicators will be, or will become, apparent to one with skill in the art upon examination of the following figures and detailed description. It is intended that all such additional implementations be included within this description, be within the scope of the disclosure, and be protected by the following claims.

In accordance with some example embodiments, provided herein is an imaging apparatus. In an example embodiment, the imaging apparatus comprises an image sensor configured to capture a first image of a scene and an optical window positioned in front of the image sensor. In some example embodiments, the optical window is configured to transmit incident light to the image sensor. The imaging apparatus also comprises a light source enclosing a perimeter of the optical window such that an illumination cone of the light source overlaps a portion of a near field of view cone of the imaging apparatus. In an example embodiment, the portion of the near field of view cone extends from a surface of the optical window to a threshold distance from the optical window. In some example embodiments, the light source is configured to produce a first illumination along a first direction extending towards the scene.

Additionally or alternatively, in some embodiments of the imaging apparatus, the imaging apparatus further comprises one or more processors configured to process the first image of the scene to detect a subject in the first image. The one or more processors further determine that the subject in the first image is aligned with a pattern and control the light source to produce a second illumination along a second direction in response to determining that the subject is aligned with the pattern.

Additionally or alternatively, in some embodiments of the imaging apparatus the light source encloses the perimeter of the optical window in a plane inclined at an angle with an optical axis of the imaging apparatus.

Additionally or alternatively, in some embodiments of the imaging apparatus, the first illumination illuminates the entirety of the portion of the near field of view cone of the imaging apparatus.

Additionally or alternatively, in some embodiments of the imaging apparatus, the second direction is orthogonal to the first direction.

Additionally or alternatively, in some embodiments of the imaging apparatus, the second illumination is of a different wavelength than the first illumination.

Additionally or alternatively, in some embodiments of the imaging apparatus, a brightness of the second illumination is lower than a brightness of the first illumination.

Additionally or alternatively, in some embodiments of the imaging apparatus, the subject comprises a decodable indicia and the pattern comprises an aimer projection.

Additionally or alternatively, in some embodiments of the imaging apparatus, the light source and the optical window are on a front face of the imaging apparatus. In some example embodiments, light incident from a scene to be imaged enters the imaging apparatus through the front face.

Additionally or alternatively, in some embodiments of the imaging apparatus, the imaging apparatus further comprises one or more processors configured to control the light source to produce the first illumination at a first brightness level. The one or more processors are further configured to obtain a second image of the scene from the image sensor, process the second image to determine if the second image satisfies one or more imaging conditions, and control the light source to produce the first illumination at a second brightness level, based on the second image failing to satisfy the one or more imaging conditions.

Additionally or alternatively, in some embodiments of the imaging apparatus, the one or more processors are further configured to obtain from the image sensor, a third image of the scene illuminated with the first illumination at the second brightness level and process the third image to decode a decodable indicia in the third image. In an example embodiment, the one or more processors are further configured to control the light source to produce the second illumination, based on the decoded decodable indicia.

Additionally or alternatively, in some embodiments of the imaging apparatus, the light source has a piped structure and comprises one or more first light elements configured to produce the first illumination and one or more second light elements configured to produce the second illumination.

In accordance with some example embodiments, provided herein is an imaging method for an imaging apparatus. In some example implementations of the method, the example method includes controlling a light source of the imaging apparatus to produce a first illumination along a first direction extending towards a scene. The first illumination illuminates the scene such that an illumination cone of the piped light source overlaps a portion of a near field of view cone of the imaging apparatus. In an example embodiment, the portion of the near field of view cone extends from a surface of an optical window of the imaging apparatus to a threshold distance from the optical window. The example method further includes obtaining from an image sensor of the imaging apparatus, a first image of the scene, detecting a subject in the first image, and determining that the subject in the first image is aligned with a pattern. The example method further includes in response to determining that the subject is aligned with the pattern, controlling the light source to produce a second illumination along a second direction different from the first direction.

Additionally or alternatively, in some embodiments of the method, the method further comprises controlling the light source to produce the first illumination at a first brightness level and obtaining from the image sensor, a second image of the scene. The method further comprises processing the second image to determine if the second image satisfies one or more imaging conditions and controlling the light source to produce the first illumination at a second brightness level, based on the second image failing to satisfy the one or more imaging conditions.

Additionally or alternatively, in some embodiments of the method, the method further comprises obtaining from the image sensor, a third image of the scene illuminated with the first illumination at the second brightness level. In an example embodiment, the method further comprises processing the third image to decode a decodable indicia in the third image and controlling the light source to produce the second illumination, based on the decoded decodable indicia.

In accordance with some example embodiments, provided herein is an indicia reading device. In an example embodiment, the indicia reading device comprises an imager configured to capture an image of a scan label. In some example embodiments, the indicia reading device also comprises a scanning window positioned in front of the imager, wherein the scanning window is configured to transmit incident light to the imager and an illuminator. The illuminator encloses a perimeter of the scanning window such that an illumination cone of the illuminator overlaps a portion of a near field of view cone of the indicia reading device. The portion of the near field of view cone extends from a surface of the scanning window to a threshold distance from the scanning window. In some example embodiments, the indicia reading device also comprises a controller configured to control the illuminator to produce a first illumination to illuminate the scan label and obtain the image of the scan label from the imager. In an example embodiment, the controller is further configured to process the image to decode a decodable indicia in the image and control the illuminator to produce a second illumination, based on the decoded decodable indicia.

Additionally or alternatively, in some embodiments of the indicia reading device, the ring illuminator has a ringed structure that encloses the perimeter of the scanning window in a plane inclined at an angle with an optical axis of the indicia reading device.

Additionally or alternatively, in some embodiments of the indicia reading device, the first illumination illuminates the entirety of the portion of the near field of view cone of the indicia reading device.

Additionally or alternatively, in some embodiments of the indicia reading device, the illuminator is configured to produce the first illumination along a first direction extending towards the scan label and produce the second illumination along a second direction orthogonal to the first direction.

Additionally or alternatively, in some embodiments of the indicia reading device, the second illumination is of a different wavelength than the first illumination.

BRIEF DESCRIPTION OF THE DRAWINGS

Figure 1A:
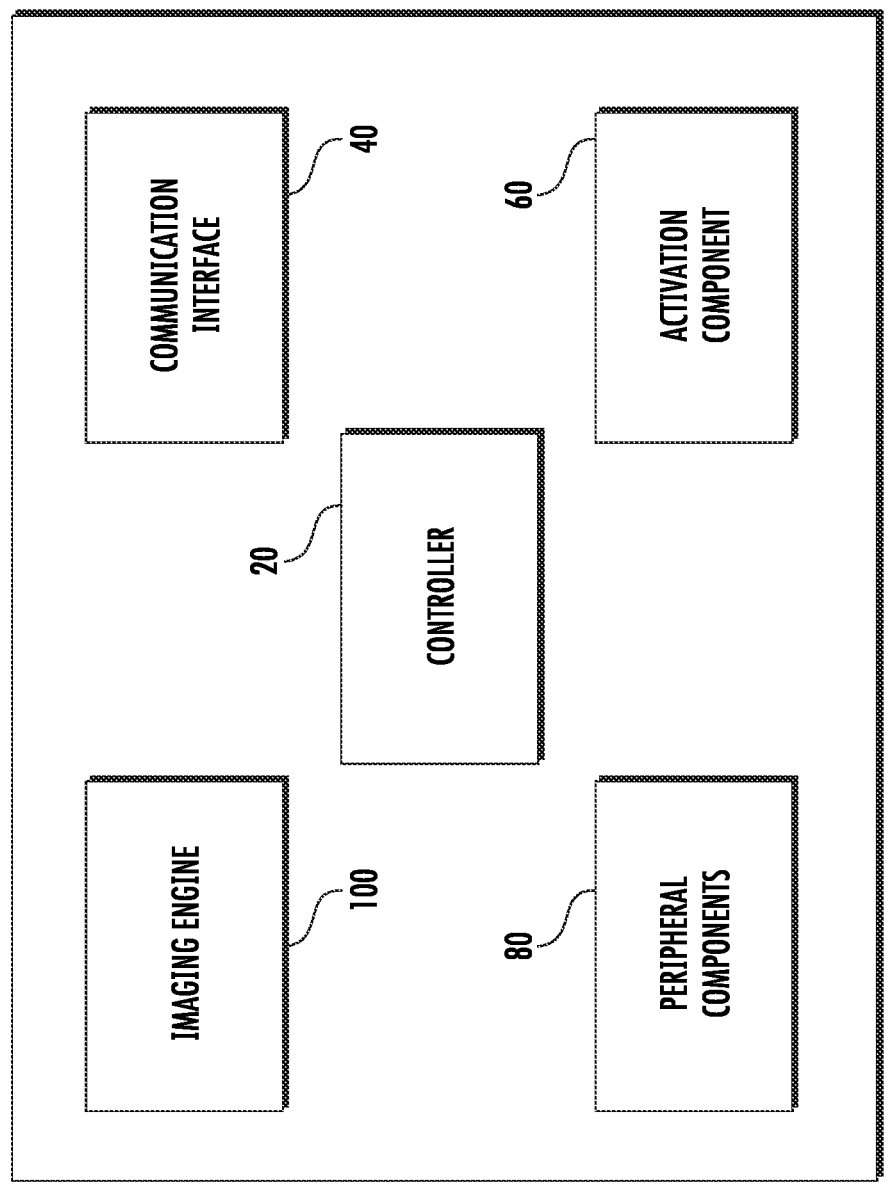
Figure 1B:
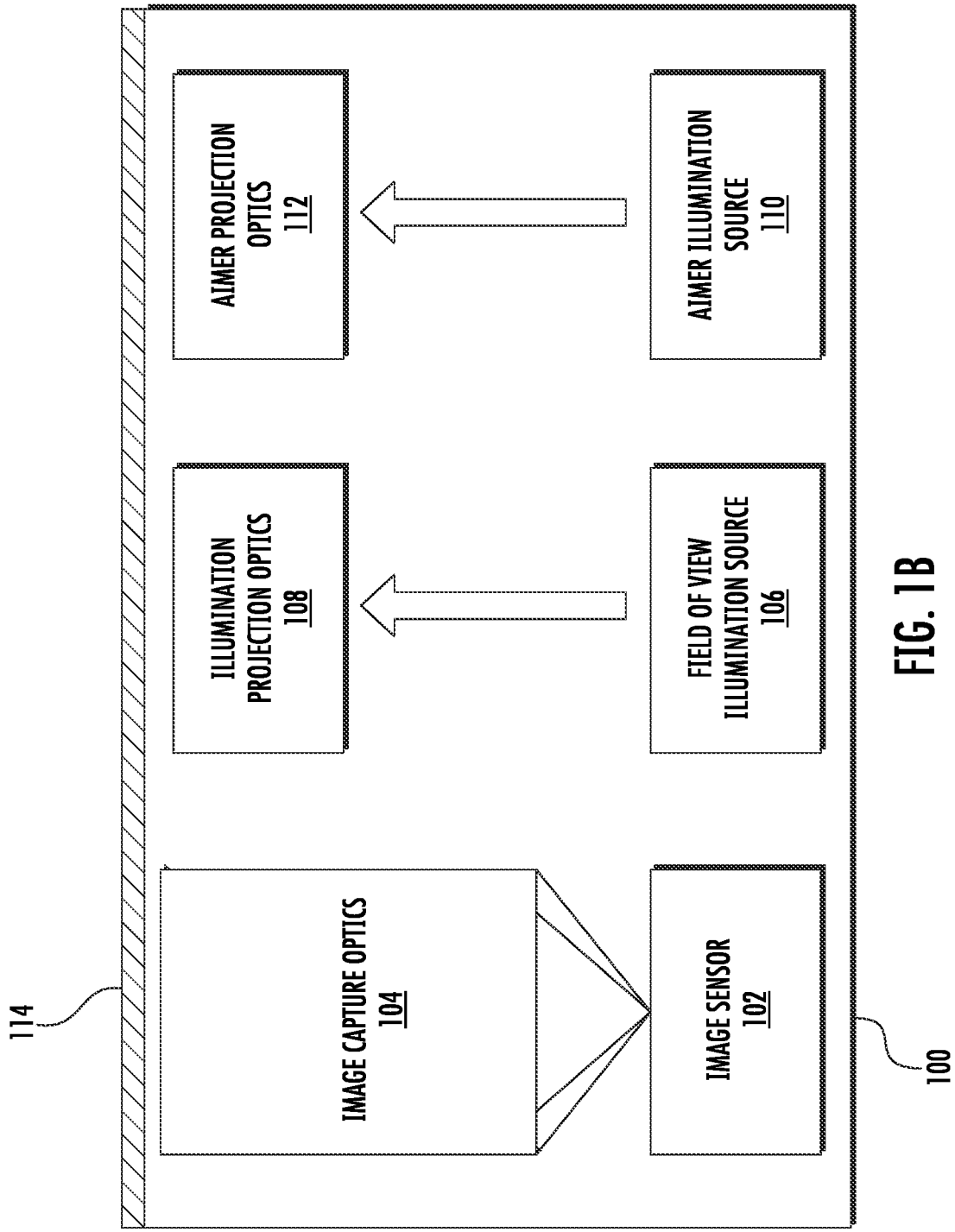
Figure 2:
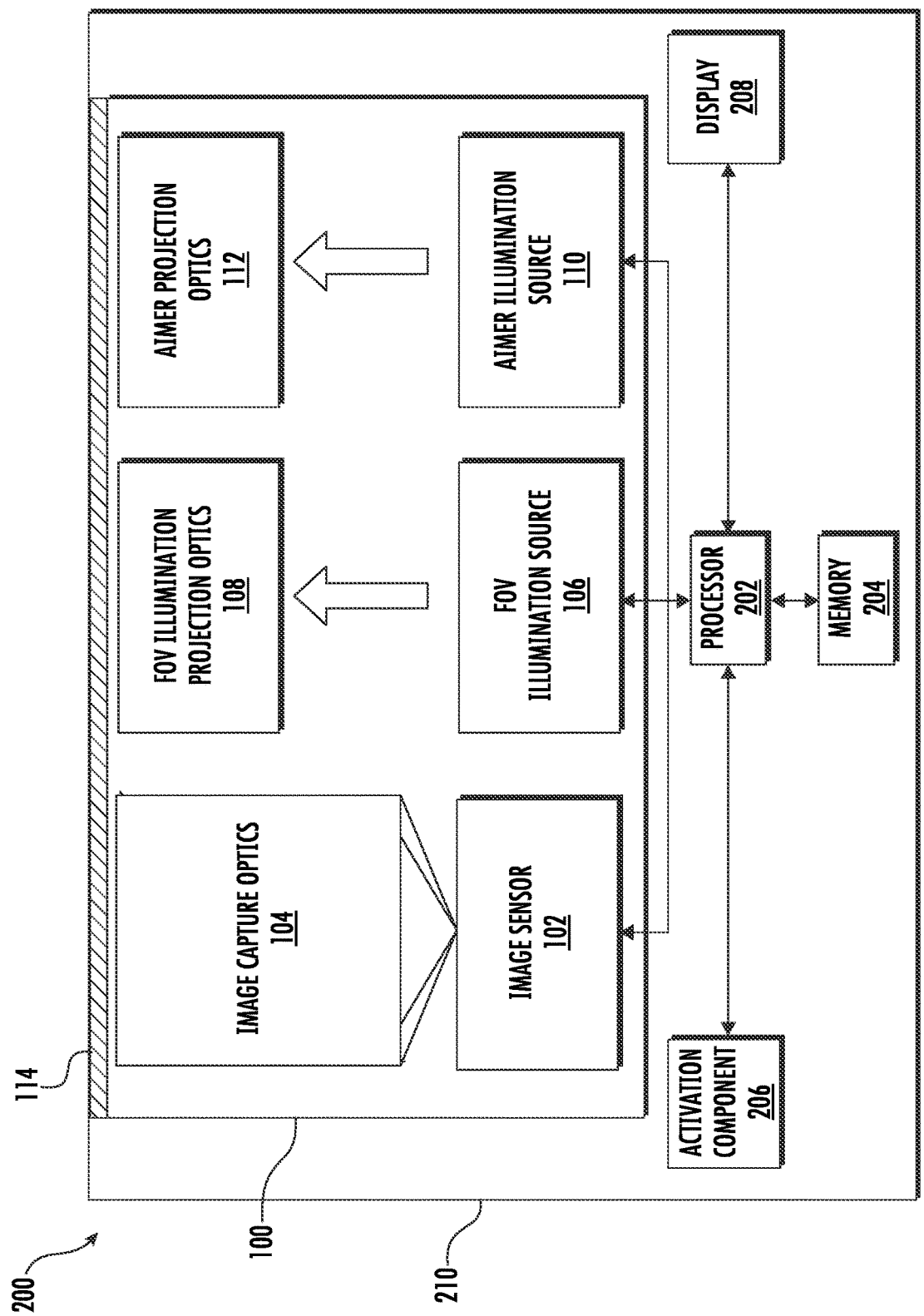
Figure 4A:
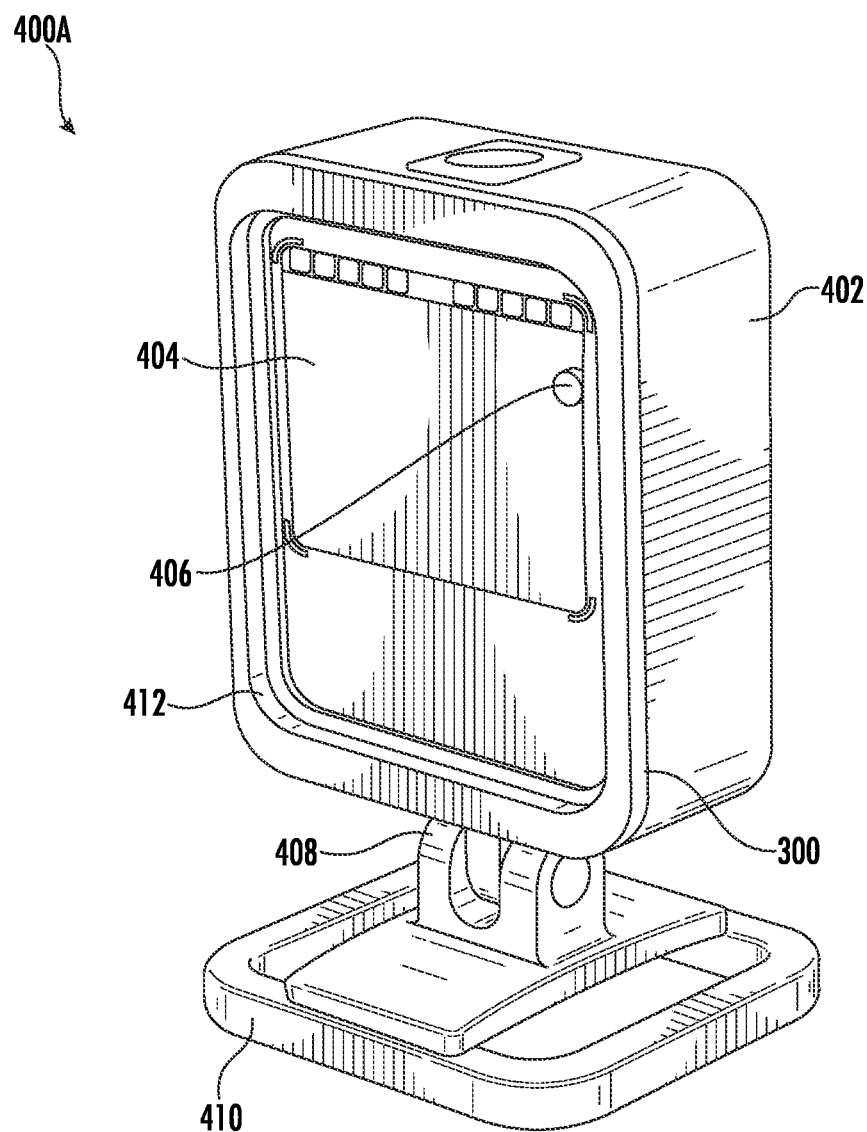
Figure 4B:
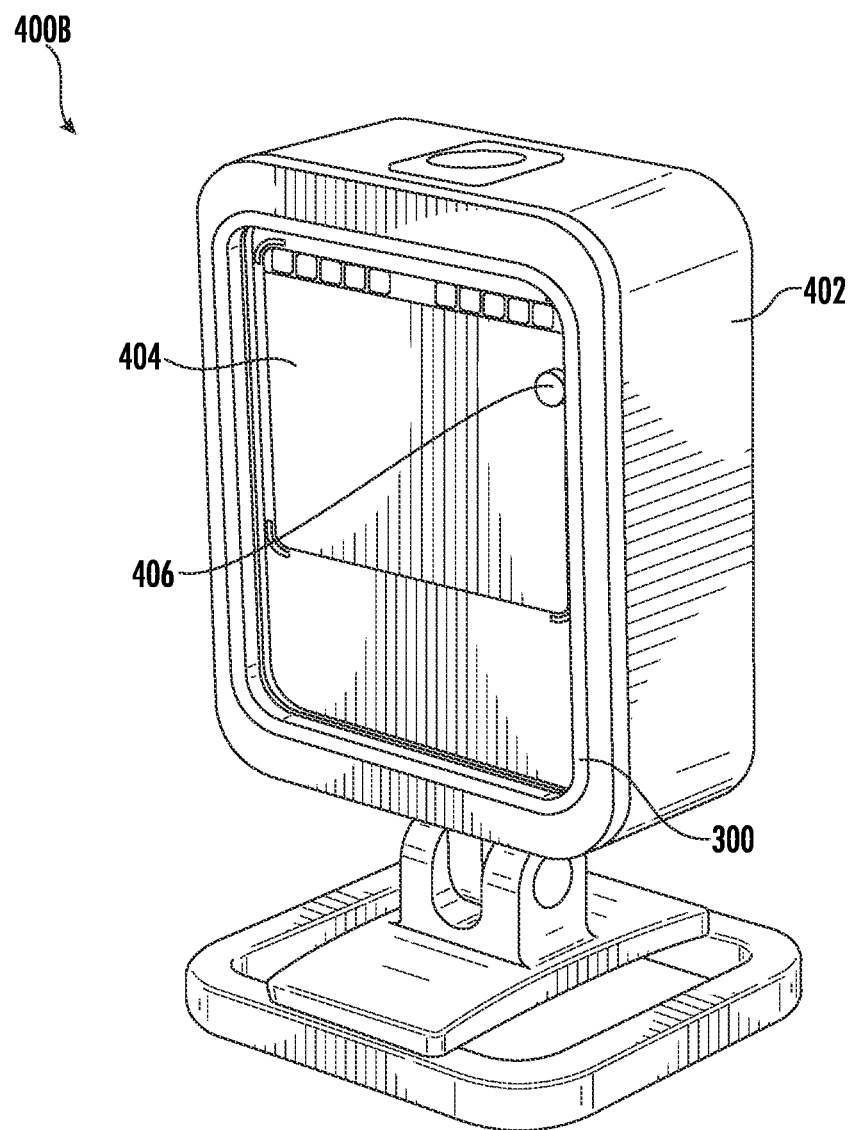
Figure 5A:
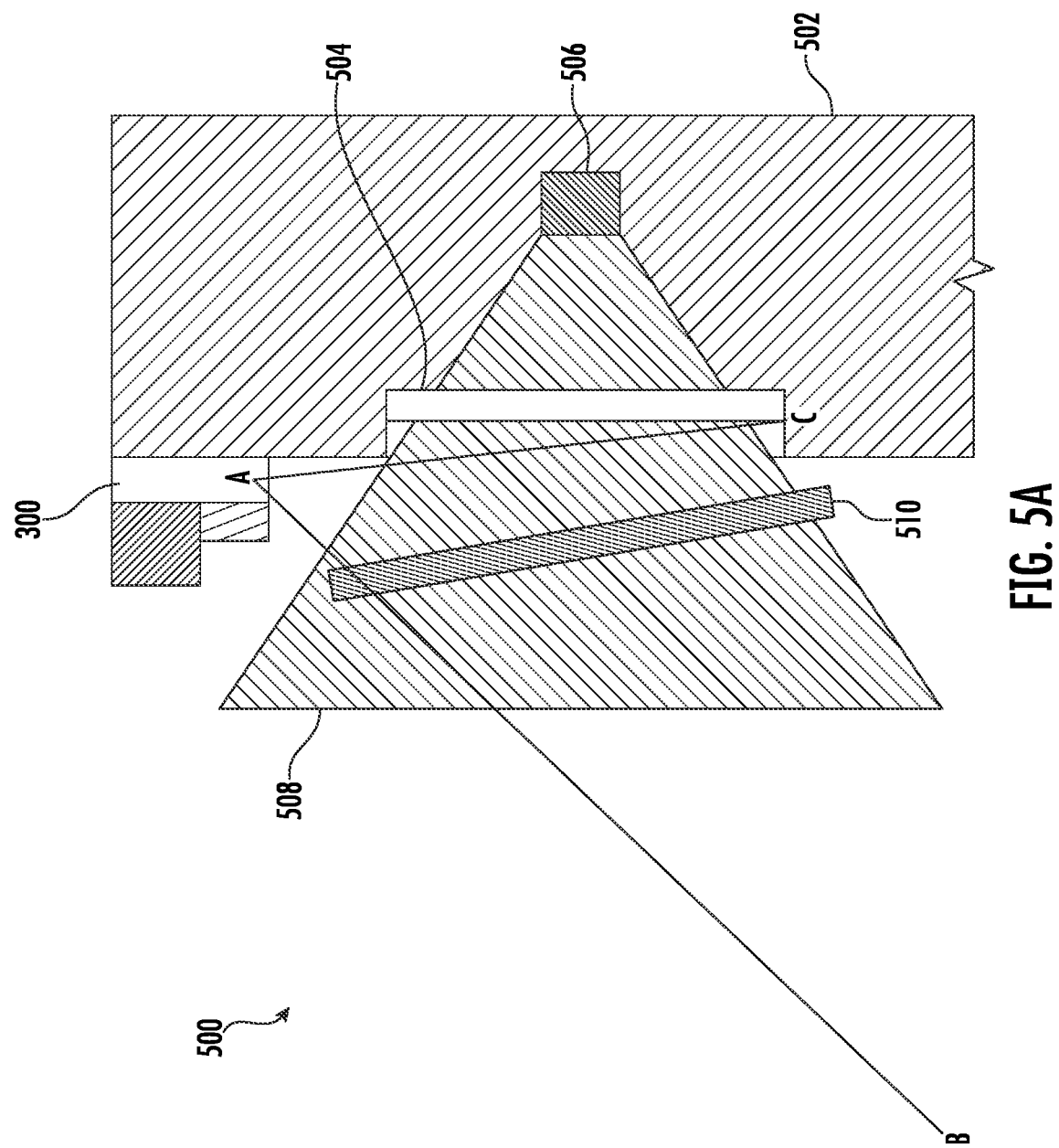
Figure 5B:
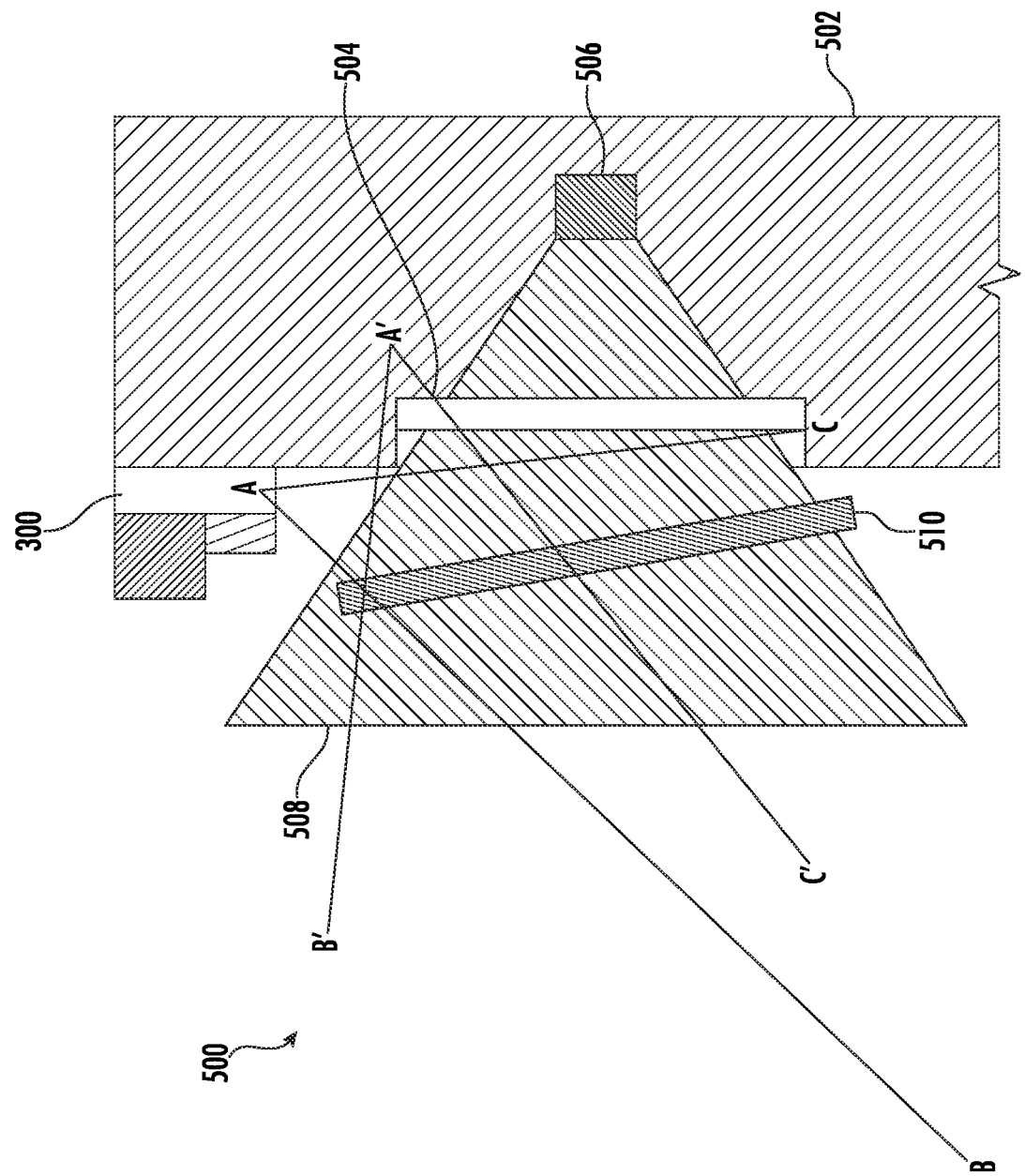
Figure 6:
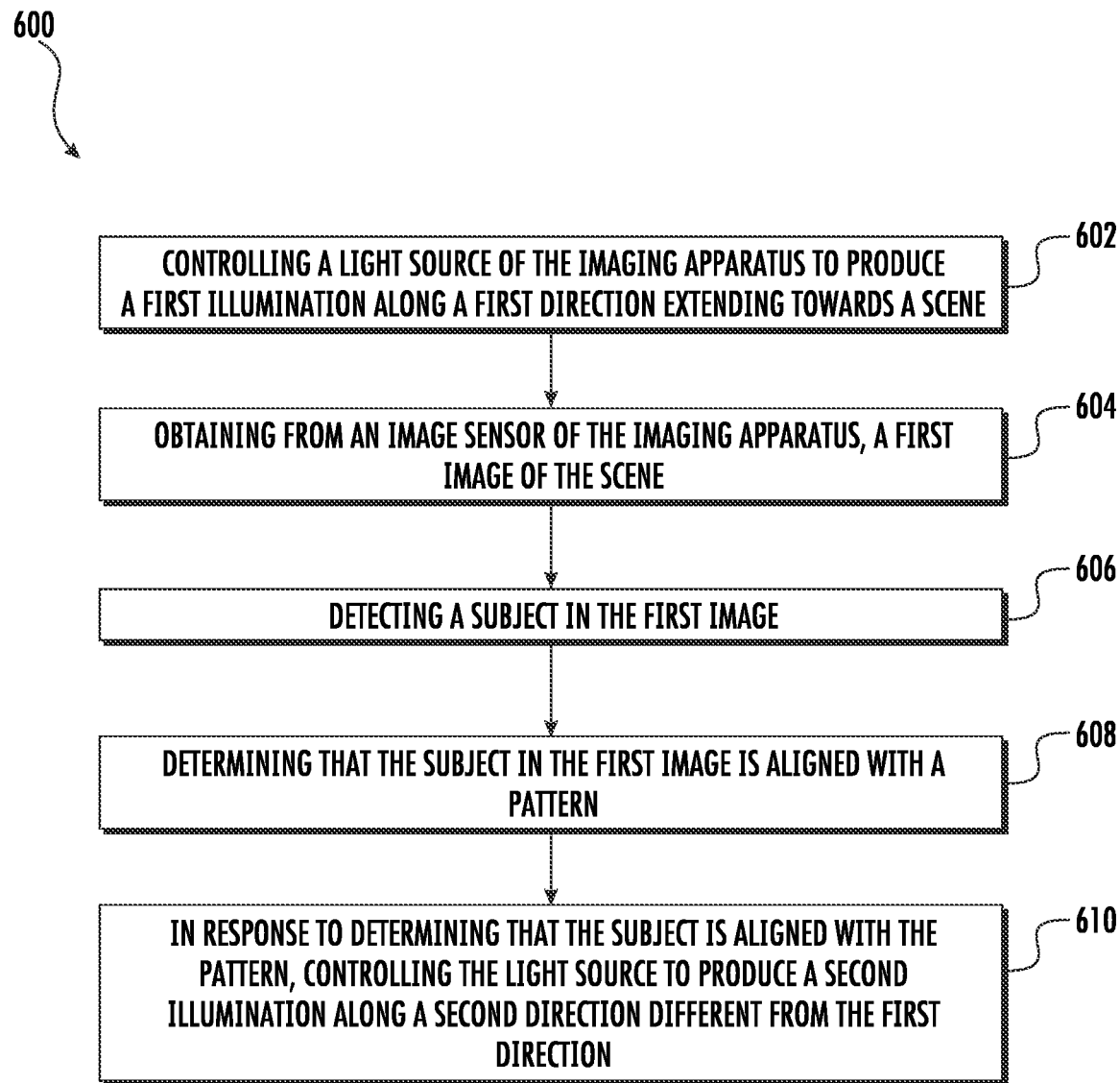

Having thus described the embodiments of the disclosure in general terms, reference now will be made to the accompanying drawings, which are not necessarily drawn to scale, and wherein:

FIG. 1A illustrates a block diagram of an example imaging system, in accordance with an example embodiment of the present disclosure;

FIG. 1B illustrates a block diagram of an example imaging engine, in accordance with an example embodiment of the present disclosure;

FIG. 2 illustrates a block diagram of an example imaging apparatus, in accordance with an example embodiment of the present disclosure;

FIG. 3 illustrates an example dual purpose illuminator, in accordance with at least one example embodiment of the present disclosure;

FIG. 4A illustrates an example indicia reading device, in accordance with at least one example embodiment of the present disclosure;

FIG. 4B illustrates an example indicia reading device with a repurposed illuminator, in accordance with at least one example embodiment of the present disclosure;

FIG. 5A illustrates a visualization of field of view and illumination in near field of an example imaging apparatus, in accordance with at least one example embodiment of the present disclosure;

FIG. 5B illustrates illumination of a conventional illuminator and illumination of a piped illuminator of an indicia reading device; and FIG. 6 illustrates a flowchart depicting example operations of an imaging method, in accordance with an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Imaging apparatuses, such as indicia readers, are used in a variety of scenarios, each requiring a specific set of imaging requirements to be met so that an operation associated with the indicia reader such as symbol decoding may be successively carried out. Owing to a large variety of application areas for the imaging readers, there are a plethora of imaging conditions in which such apparatuses are used. The operability of these apparatuses is limited by the type of imaging conditions in which they are successfully capable of processing the captured image(s). Effective image processing requires efficient image capture which in turn is governed by several imaging factors such as focus, exposure, illumination and the like. Also, it is preferred for such apparatuses to perform the image capture and image processing within a time duration that is as short as possible. One way of shortening this time duration is to fasten up the image processing task by use of efficient algorithms and hardware. However, there is a limit to such upgradations considering the limited form factor, weight, and power supply available for such apparatuses. Thus for devices limited by form factor and/or size and available power supply, it is desired that the time taken to capture an image suitable for image processing, is as short as possible. Also the capability to capture images only when subjects are placed beyond a certain distance limits the usability of such devices. Furthermore, owing to miniaturized sizes of the imaging devices, different components are housed in a very compact space. As such, oftentimes there is an interaction between the illumination and field of view of an image sensor in a region behind an optical window of the imaging device. Such interaction may produce noise in the resultant image which is undesired. Further, such compact placement of illuminators alongside image sensors creates a shadow region in front of the imaging device that remains partially or fully unilluminated. Such imaging devices and systems thus have limited operability for image capture.

Imaging apparatuses and systems utilize a near field illumination source that illuminates a near field of view of the apparatus/system. Oftentimes the illumination provided by such illuminators does not reach a region that lies close to the front face of the imaging apparatus because the illuminator is positioned in a recess or depression having a limited illumination expanse. Owing to a wide variety of applications of such imaging apparatuses, it is desired at times that the subject is located in such a region that remains partially illuminated or even without illumination. In such scenarios, the subject is not properly illuminated which results in poor image capture and subsequently poor decoding. In some scenarios, the imaging apparatus may perform multiple retakes in an attempt to capture a decodable image of the subject. Because the illumination is unable to reach the subject despite the multiple attempts to capture the image, the imaging apparatus incurs delay in the underlying image processing task thus hampering other operations as well.

Some embodiments described herein relate to a dual-purpose illuminator for an imaging device. Some embodiments described herein relate to methods of imaging using the imaging device with the dual-purpose illuminator. Some embodiments utilize positional relationship between the illuminator and the image sensor to capture images of subjects placed very close to the imaging device. Some embodiments utilize the illuminator to convey feedback relating to image capture events. The illuminator may have one or more light elements to accomplish the dual purpose described above. In some embodiments, one or more events may be triggered indicating circumstances where a key step associated with image capture is executed. Based on the result of such events, the illuminator is controlled to produce illumination.

Such embodiments provide effective illumination in regions that otherwise remain under illuminated using minimal additional components. The operation of such embodiments captures images in a manner likely to result in successfully completing an image processing task, such as indicia or symbol scanning, while increasing the likelihood an image is captured within a desired operational time frame that includes data sufficient for successful processing. By way of implementation of various example embodiments described herein, an operational efficiency of the imaging apparatus is maintained or improved while addressing the challenges arising out of varying imaging conditions.

In some embodiments, some of the operations above may be modified or further amplified. Furthermore, in some embodiments, additional optional operations may be included. Modifications, amplifications, or additions to the operations above may be performed in any order and in any combination.

Definitions

The term "illumination" refers to one or more light rays produced by an illumination source within a defined field of view. In at least one example context, the illumination includes one or more illumination pulses produced by a corresponding illumination source. In some embodiments, an illumination is produced based on a "defined pulse frequency," which refers to a rate at which illumination pulses are produced by an illumination source. Additionally or alternatively, in some embodiments, an illumination is produced based on a "defined pulse phase," which refers to a period of activation for which an illumination source is producing a corresponding illumination. Thus, illumination period may refer to the time duration for which the illumination source remains activated corresponding to the illumination pulse.

The term "illumination source" (also referred to as "illuminator source" or "illuminator") refers to one or more light generating hardware, devices, and/or components configured to produce an illumination within a desired field of view. Non-limiting examples of an illumination source includes one or more light emitting diode(s) (LEDs), laser(s), and/or the like. One or more illumination sources may be dedicatedly or commonly available for each image sensor and/or projection optics of the multi-image sensor system.

The term "near-field illumination source" refers to an illumination source configured to produce an illumination for illuminating a near-field of view associated with a near-field image sensor. In at least one example context, the near-field illumination source is configured to produce an illumination in a wider field of view as compared to that of a far-field illumination source.

The term "far-field illumination source" refers to an illumination source configured to produce an illumination for illuminating a far-field of view associated with a far-field imager. In at least one example context, the far-field illumination source is configured to produce an illumination in a narrower field of view as compared to that of a near-field illumination source.

The term "near-field illumination" refers to a particular illumination produced by a near-field illumination source. In some embodiments, the near-field illumination is associated with illumination of a near field of view captured by a near-field image sensor.

The term "far-field illumination" refers to a particular illumination produced by a far-field illumination source. In some embodiments, the far-field illumination is associated with illumination of a far field of view captured by a far-field image sensor.

The term "imager" or "imaging module" refers to one or more components configured for capturing an image representing a particular field of view. In at least one example context, an imager includes at least one optical component (e.g., lens(es) and/or associated housing(s)) defining a particular field of view. Additionally or alternatively, in at least one example context, an imager includes an image sensor configured to output an image based on light that engages with the image sensor, such as via the optical components.

The term "image sensor" refers to one or more components configured to generate an image represented by a data object based on light incident on the image sensor. In some such example contexts, an image sensor converts light waves that interact with the image sensor into signals representing an image output by the sensor.

The term "subject" or "target" refers to one or more regions of interest in the scene being imaged. In some example embodiments, the subject may be optically distinguishable from the background of the scene being imaged.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

FIG. 1A illustrates a block diagram of an example imaging system 10, in accordance with an example embodiment of the present disclosure. The imaging system 10 includes an imaging engine 100 communicatively coupled with a controller 20, a communication interface 40, an activation component 60, and one or more peripheral components 80. In some example embodiments, the imaging system 10 may include fewer or more components than shown in FIG. 1A. The imaging system 10 is configured for capturing one or more images of a target in one or more fields of views using one or more illumination sources. The imaging system 10 processes the one or more images to execute one or more image processing tasks such as indicia reading. Accordingly, in some example embodiments of the disclosure, the imaging system 10 may be embodied in part or full as an indicia or symbol reader or a handheld device capable of reading indicia and similar symbols. One example embodiment of the imaging system 10 is illustrated in FIG. 2, details of which will be described in the subsequent portions of the disclosure.

Controller 20 may be configured to carry out one or more control operations associated with the imaging system 10. For example, controller 20 may control the imaging engine 100 to cause image capture of a target in a field of view of the imaging engine 100. Additionally, the controller 20 may process the captured images to carry out one or more image processing tasks. The controller 20 may be embodied as a central processing unit (CPU) comprising one or more processors and a memory. In some example embodiments, the controller 20 may be realized using one or more microcontroller units (MCU), as one or more of various hardware processing means such as a coprocessor, a microprocessor, a digital signal processor (DSP), a processing element with or without an accompanying DSP, or various other processing circuitry including integrated circuits such as, for example, an ASIC (application specific integrated circuit), an FPGA (field programmable gate array), a hardware accelerator, a special-purpose computer chip, or the like. In some embodiments, the processor of the controller 20 may include one or more processing cores configured to operate independently. A multi-core processor may enable multiprocessing within a single physical package. Additionally, or alternatively, the processor may include one or more processors configured in tandem via the bus to enable independent execution of instructions, pipelining and/or multithreading.

The memory may be non-transitory and may include, for example, one or more volatile and/or non-volatile memories. For example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like, for enabling the apparatus to carry out various functions in accordance with an example embodiment of the present invention. For example, the memory could be configured to buffer data for processing by the processor. Additionally, or alternatively, the memory could be configured to store instructions for execution by the processor.

The processor (and/or co-processors or any other processing circuitry assisting or otherwise associated with the processor) may be in communication with the memory via a bus for passing information among components of the imaging system 10. The processor may be configured to execute instructions stored in the memory or otherwise accessible to the processor. Additionally, or alternatively, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. The processor may include, among other things, a clock, an arithmetic logic unit (ALU) and logic gates configured to support operation of the controller 20.

The communication interface 40 may comprise input interface and output interface for supporting communications to and from the imaging system 10. The communication interface 40 may be any means such as a device or circuitry embodied in either hardware or a combination of hardware and software that is configured to receive and/or transmit data to/from a communications device in communication with the imaging system 10. In this regard, the communication interface 40 may include, for example, an antenna (or multiple antennae) and supporting hardware and/or software for enabling communications with a wireless communication network. Additionally or alternatively, the communication interface 40 may include the circuitry for interacting with the antenna(s) to cause transmission of signals via the antenna(s) or to handle receipt of signals received via the antenna(s). In some environments, the communication interface 40 may alternatively or additionally support wired communication. As such, for example, the communication interface 40 may include a communication modem and/or other hardware and/or software for supporting communication via cable, digital subscriber line (DSL), universal serial bus (USB) or other mechanisms.

The activation component 60 may include hardware, software, firmware, and/or a combination thereof, configured to indicate initiation (and/or termination) of desired functionality by the user. For example, the activation component 60 may transmit an activation signal to cause the controller 20 to begin operation of the imaging engine 100, for example to begin illumination by one or more illumination sources, and/or capture by image sensors, one or more images. Additionally or alternatively, the activation component 60 may transmit a deactivation signal to the controller 20 to terminate the corresponding functionality, for example to cease scanning via an image sensor. In some embodiments, the activation component 60 is embodied by one or more buttons, triggers, and/or other physical components provided in or on the body of a chassis. For example, in at least one example context, the activation component 60 is embodied by one or more "trigger" components that, when engaged by an operator (e.g., when an operator squeezes the trigger), transmits a signal to the controller 20 to initiate corresponding functionality. In some such embodiments, the activation component may transmit a deactivation signal to the controller 20 to cease such functionality when the component is disengaged by the operator (e.g., when the operator releases the trigger). Alternatively or additionally, in at least some embodiments, the activation component 60 is embodied without any components for direct engagement by an operator. For example, when the imaging system 10 is embodied as an imaging apparatus, the activation component 60 may be embodied by hardware and/or software, or a combination thereof, for detecting the imaging apparatus has been raised and/or positioned to a predefined "scanning" position, and/or lowered from that position to trigger deactivation. Alternatively or additionally, the activation component 60 may be embodied as a user interface element of the imaging system 10. In such embodiments, the activation component 60 embodied as a user interface element may be configured to receive an input from the user on a user interface and in turn transmit a corresponding command to the controller 20.

The one or more peripheral components 80 include other structural and functional elements of the imaging system 10 such as for example a display device, a user interface, a housing, a chassis, power source and the like. One or more of the peripheral components 80 may be controlled by the controller and may operate as per instructions or control provided by the controller 20.

FIG. 1B illustrates an example imaging engine in accordance with an example embodiment of the present disclosure. Specifically, as illustrated, the example imaging engine is embodied by an imaging engine 100. The imaging engine 100 includes one or more image sensors, for example, a near-field image sensor and/or a far-field image sensor, configured for capturing image data objects in a near field of view associated with the near-field image sensor and/or a far field of view associated with the far-field image sensor, respectively. In at least one example context, the imaging engine 100 is configured for capturing images for purposes of indicia reading at different ranges, such as a close-range using a near-field image sensor and a far-range using a far-field image sensor.

As illustrated, the imaging engine 100 includes image capture optics 104. The image capture optics 104 may be embodied by one or more lens(es) and/or other optical components configured to enable light to transverse through and interact with a corresponding image sensor, for example the image sensor 102. The image sensor may include an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, back-illuminated technologies. The image sensor may be either a progressive or interleaved imager. The image sensor may contain an array of light sensitive photodiodes (or pixels) that convert incident light energy into electric charge. An exemplary image sensor may use a mono color image sensor that may include a filter element defining color sensitive pixel elements dispersed throughout an array of monochrome pixels. An exemplary image sensor may include an image sensor processor, an analog to digital converter (ADC) and other circuitry.

The image capture optics 104 may define a particular field of view that may be captured by an image sensor 102. In some embodiments, the image capture optics 104 defines a field of view associated with a focal range, such that objects located at and/or within a determinable offset from the focal range may be clear in images captured by the image sensor 102.

In some example embodiments, the image sensor 102 may include a global shutter to provide enhanced motion tolerance. The image sensor 102 may use a large Field of View (FOV), the large FOV enabling applications such as but not limited to optical character recognition (OCR), image reconstruction, machine learning etc. Additionally or optionally. in some embodiments, the image sensor 102 may include a rolling shutter. The image sensor 102 uses a small FOV to improve the sampling of far field. Additionally, the image sensor 102 may have an associated focus mechanism. The focus mechanism may include a focus scheme that controls movement of one or more focus lenses along an optical axis direction of the image sensor 102. Towards this end, in some embodiments, the focus scheme may include one or more motion actuators, for example, stepper motors or piezoelectric actuators. In some example embodiments, the focus scheme may be inbuilt in the lenses for example in variable (e.g. liquid) lenses.

The focus scheme may provide a plurality of discrete focus positions in a field of view and the motor may move the focus optics of a particular image sensor to each of the discrete focus positions to exhibit the focus mechanism. For example, in some example embodiments, to change the focusing of the image sensor 102, the corresponding motor may move the associated focus optics of the image sensor 102 to three discrete focus positions in the far field. The operation of the focus mechanism may be controlled by a processing component such as the controller 20 of FIG. 1A or the processor 202. In some example embodiments, where the lenses have inbuilt focus scheme, the processing component may control the focusing of the lenses using estimated distance data.

In some embodiments, for example as illustrated, the image sensor 102 is associated with one or more components for producing an illumination configured for illuminating the field of view defined by the image sensor 102. For example, as illustrated, the imaging engine 100 additionally comprises the field of view illumination source 106 and corresponding projection optics 108. In some example embodiments, the illumination source 106 may be a near-field illumination source that is configured to produce light in the optical axis direction of a near-field projection optics. This light may refract through the projection optics 108 to produce a near-field illumination, which may be produced in a desired pattern based on the configuration and design of the projection optics 108. In this regard, the illumination produced by light exiting the projection optics 108 may illuminate a particular field of view, such as the near field of view capturable by the image sensor 102.

Additionally in some embodiments, the imaging engine 100 further comprises an aimer illumination source 110. The aimer illumination source 110 is configured to produce light in the direction of the aimer projection optics 112. For example, the aimer illumination source comprises one or more laser diodes and/or high intensity LED(s) configured to produce sufficiently powerful and/or concentrated light. The light is refracted through the aimer projection optics 112 to produce an aimer illumination, which may be produced in a desired pattern based on the configuration and design of the aimer projection optics 112. In one example context, for purposes of barcode scanning for example, the aimer pattern may be produced as a laser line pattern, a laser dot pattern, as two parallel lines enclosing a finite region in between and the like.

The imaging engine 100 further comprises an optical scanning window 114. The optical scanning window 114 may serve as a protective covering for the elements of the imaging engine 100 that require exposure to external illumination. The protective window 114 comprises one or more optical components configured to enable produced light to exit the engine 100, and incoming light to be received for example, through the image capture optics 104 to interact with the image sensor 102. In some example embodiments, the optical scanning window 114 (hereinafter also referred to as optical window 114 or scanning window 114) may be made of a transparent or translucent material that allows radiation of at least some predefined wavelengths to pass through it. For example, the scanning window 114 may be made of suitable materials such as fiber, glass, or plastic that allow illumination to pass through. In some example embodiments, the scanning window 114 may have a flat face to prevent optical aberration. In some example embodiments, the scanning window 114 may have a non-linear surface with at least some portions of the scanning window 114 exhibiting optical properties such as magnification or demagnification.

It should be appreciated that, in other embodiments, an imaging engine 100 may include any number of image capture optics, image sensors, illumination sources, and/or any combination thereof. In this regard, the imaging engine 100 may be extended to capture any number of field of views, which may each be associated with a corresponding illuminator designed for specifically illuminating a corresponding field of view. One or more of the illumination source(s) may negatively affect operation of another illuminator. In such circumstances, when one such illumination source is active, the negatively affected image sensor may be activated between illumination pulses of the illumination source as described herein. Such operation may be implemented for any combination(s) of illumination source and image sensor.

In some embodiments, the imaging engine 100 includes one or more processing components (e.g., a processor and/or other processing circuitry) for controlling activation of one or more components of the imaging engine 100. For example, in at least one example embodiment, the imaging engine 100 includes a processor configured for timing the illumination pulses of the illumination source 106, and/or controlling the exposing of the image sensor 102. In some such contexts, the processor is embodied by any one of a myriad of processing circuitry implementations, for example as a FPGA, ASIC, microprocessor, CPU, and/or the like. In at least some embodiments, the processor may be in communication with one or more memory device(s) having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

FIG. 2 illustrates a block diagram of an example an imaging apparatus 200, in accordance with an example embodiment of the present disclosure. As illustrated, the imaging apparatus 200 comprises an apparatus chassis 210 for housing the various components of the apparatus. In this regard, it should be appreciated that the apparatus chassis may be embodied in any of a myriad of chassis designs, using any of a myriad of materials, and/or the like, suitable to position the various components of the multi-sensor imaging apparatus 200 for operation. In at least one example context, the apparatus chassis 210 may be embodied as a handheld apparatus chassis, wearable chassis, and/or the like.

The imaging apparatus 200 comprises the imaging engine 100 as described above with respect to FIG. 1B. The imaging apparatus 200 further comprises a processor 202. The processor 202 (and/or any other co-processor(s) and/or processing circuitry assisting and/or otherwise associated with the processor 202) may provide processing functionality to the imaging apparatus 200. In this regard, the processor 202 may be embodied in any one of a myriad of ways as discussed with respect to the controller 20 of FIG. 1A.

In some example embodiments, the processor 202 is configured to provide functionality for operating one or more components of the imaging apparatus 200. For example, the processor 202 may be configured for activating the illumination source 106, and/or the aimer illumination source 110. Additionally or alternatively, in some embodiments, the processor 202 is configured for activating the image sensor 102 to expose the image sensor, and/or for reading out the captured data to generate an image based on the data captured during exposure. Additionally or alternatively, in some embodiments, the processor 202 is configured to process the captured image(s), for example based on one or more image processing task(s). In one such example context, the processor 202 is configured to perform an attempt to detect and decode visual indicia(s), such as 1D and/or 2D barcodes, from a captured image. In this regard, the processor 202 may be configured to utilize a visual indicia parsing algorithm and/or a visual indicia decoding algorithm to provide such functionality.

Additionally or alternatively, optionally in some embodiments, the imaging apparatus 200 further include activation component 206. The activation component 206 may be embodied in a myriad of ways as discussed with respect to the activation component 60 of FIG. 1A.

Additionally or alternatively, optionally in some embodiments, the imaging apparatus 200 further includes a display 208. The display 208 may be embodied by a LCD, LED, and/or other screen device configured for data provided by one or more components of the apparatus 200. For example, in some embodiments, the display 208 is configured for rendering a user interface comprising text, images, control elements, and/or other data provided by the processor 202 for rendering. In some embodiments, for example, the display 208 is embodied by an LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user interaction, and/or may transmit one or more corresponding signals to the processor 202 to trigger functionality based on the user interaction. In some such embodiments, the display 208 may be configured to provide user interface functionality embodying activation component 206, for example to enable an operator to initiate and/or terminate scanning functionality via interaction with the user interface.

Additionally or alternatively, optionally in some embodiments, the imaging apparatus 200 further includes a memory 204. The memory 204 may provide storage functionality, for example to store data processed by the imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be embodied in a myriad of ways discussed with reference to the controller 20 of FIG. 1A. The memory 204 may be configured to store information, data, content, applications, instructions, or the like, for enabling the imaging apparatus 200 to carry out various functions in accordance with some example embodiments. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may specially configure the processor 202 to perform the algorithms and/or operations described herein when the instructions are executed.

In some example embodiments of the present disclosure, processor 202 and memory 204 may together be embodied as an imaging control apparatus and may therefore be fixed or detachably coupled with the imaging apparatus 200 or may be partially or completely outside the imaging apparatus 200. In some embodiments, the imaging control apparatus may be embodied as an integrated circuit that is operatively coupled with the imaging apparatus 200.

Additionally or optionally, in some example embodiments, the imaging apparatus 200 may also include a feedback mechanism to convey completion of one or more successful events pertaining to image capture by the imaging apparatus 200. In this regard, the feedback mechanism in some example embodiments may include an indication ring that illuminates upon completion of a successful event associated with image capture. The indication ring may be positioned on a body of the imaging apparatus 200 in a manner that the illumination of the indication ring is visible from all possible perspective views of the imaging apparatus 200. For example, when the imaging apparatus 200 is embodied as a polygon, the indication ring may be wrapped along a perimeter of the imaging apparatus 200 in one or more dimensions. The indication ring may produce visible illumination of a variety of wavelengths, where each wavelength may be associated with one specific image capture event. For example, in some example embodiments, the indication ring may illuminate with a red colored light to indicate unsuccessful alignment of the imaging apparatus 200 with a subject to be imaged. Additionally or optionally, the indication ring may illuminate with a green colored light to indicate successful alignment with the subject to be imaged. In some example embodiments, the indication ring may produce illumination in a pattern such as continuous or blinks or for a certain number of times to indicate successful image capture and/or decoding of the subject. Several other possible alterations and supplementations in this regard may be possible with the indication ring within the scope of this disclosure. In some example embodiments, the indication ring may coexist with the illumination source 106 as a piped illuminator or illumination source, details of which is described next with reference to FIG. 3.

FIG. 3 illustrates an example dual purpose illuminator, in accordance with at least one example embodiment of the present disclosure. Specifically, a vertical cross-sectional view of a dual-purpose illuminator is shown in FIG. 3. The illuminator 300 comprises a tubular or piped structure having a transparent or translucent outer covering. In some example embodiments, the tubular or pipe structure may be hollow cylindrical or cuboidal in shape. A portion of the outer covering that is towards an outer side of the imaging apparatus (vertically upward side when viewed from the imaging apparatus's perspective) may be considered as the upper portion 308A of the outer covering. A portion of the outer covering that faces the field of view (vertically downward side when viewed from the imaging apparatus's perspective) may be considered as the lower portion 308B of the outer covering. The upper portion 308A and lower portion 308B of the outer covering may have same or different optical properties. Since it may be desired that the lower portion 308B illuminate the near-field of view, especially a region close to the front face of the imaging apparatus 200, one or more light elements 304 may be provided on a base substrate 306 such that the one or more light elements 304 emit light towards the region close to the front face of the imaging apparatus. Additionally, since the tubular illuminator 300 also functions as an indication ring to convey feedback in response to successful completion of one or more image capture events, one or more light elements 302 may be provided on the base substrate 306 such that the one or more light elements 302 emit light in a direction other than that of the emitted light from the one or more light elements 304. Thus, when mounted on the imaging apparatus 200, the piped illuminator 300 may be enclosed in a purpose-built recess on the outer body towards the front face of the imaging apparatus 200. In such configurations, light emitted from the one or more light elements 304 passes through the lower portion 308B of the outer covering and is dispersed in the near field of view region of the imaging apparatus 200. Additionally, in such configurations, the light emitted from the one or more light elements 302 passes through the upper portion 308A of the outer covering and is dispersed in the region around the imaging apparatus 200 to be visible from all sides of the imaging apparatus 200.

The one or more light elements 302 and 304 may be of the same type. In some example embodiments, the one or more light elements 302 and 304 may be of different type. For example, the light elements 304 which serve as a near field illumination source may produce brighter and monochrome light in comparison to the light elements 302 which serve as indicators and may thus produce multicolored or monochromatic light. Thus, illumination produced by each of the light elements 302 and 304 may have a same or different wavelength. Some non-limiting examples of the light elements 302 and 304 may illustratively include light emitting diodes (LEDs), in an illustrative embodiment. LEDs with any of a wide variety of wavelengths and filters or combination of wavelengths or filters may be used in various embodiments. Other types of light sources may also be used in other embodiments.

FIG. 4A illustrates an example indicia reading device, in accordance with at least one example embodiment of the present disclosure. In some example embodiments, the imaging apparatus 200 may be embodied in part or full as an indicia reading device 400A. The indicia reading device 400A is configured to perform scanning and reading of indicia such as barcodes, QR codes etc. In some example embodiments, the indicia reading device 400A may be handheld, mountable or both. The indicia reading device 400A comprises a housing 402 enclosing various parts and components of the indicia reading device 400A. The housing 402 also provides a form factor to the indicia reading device 400A. The indicia reading device 400A includes a scanning window 404 on the front side of the indicia reading device 400A. The scanning window 404 may be similar to the scanning window 114 discussed previously with reference to FIG. 1B. One or more image sensors 406 may reside within an optical region defined on the interior side of the scanning window 404. The image sensors 406 may be similar to the image sensors 102 discussed with reference to FIG. 1B. The housing 402 may have a pivotable protrusion on a lower side of the indicia reading device 400A that forms a hinge with another protrusion 408 of a base stand 410 of the indicia reading device 400A. The hinge provides a mechanism for rotating the indicia reading device 400A in one or more dimensions. In some example embodiments, the indicia reading device 400A may be removably attached with the base stand 410 such that a user of the indicia reading device 400A may use it in a handsfree mode as well as a handheld mode. Towards the front face of the indicia reading device 400A and across the outer sides of indicia reading device 400A, the piped illuminator 300 discussed with reference to FIG. 3 may be provided on the housing 402. In order to allow light from the lower portion 308B of the piped illuminator 300 to reach the near field of view region of the indicia reading device 400A, a cut 412 may exist at least along one or more regions of contact between the piped illuminator 300 and the housing 402. Additionally, the piped illuminator 300 may be provided in such a manner that the upper portion 308A of the outer covering of the piped illuminator 300 is exposed at one or more areas to the surroundings of the indicia reading device 400A. In this way, the piped illuminator 300 may perform a dual purpose of providing sole or additional illumination to the near field of view of the indicia reading device 400A as well as providing an indication ring to output feedback pertaining to completion of one or more successful image capture events. In some example embodiments, the piped illuminator 300 may be provided in addition to a near field illumination source of the indicia reading device 400A. In such embodiments, the piped illuminator may illuminate at least a portion of the near field of view, especially the portion of the near field of view that lies close to the scanning window 404.

In some example embodiments, the piped illuminator 300 may be repurposed to be mounted or provided on a front face of the indicia reading device 400A instead of the outer sides of the indicia reading device 400. FIG. 4B illustrates one such example embodiment of an indicia reading device 400B. Indicia reading device 400B may have same structure and composition as indicia reading device 400A. The piped illuminator 300 may be provided on the front face of the indicia reading device 400B such that the piped illuminator 300 encloses a perimeter of the scanning window 404. In such example embodiments, the piped illuminator 300 and the scanning window 404 may be coplanar or lie in different planes. In such configurations, the piped light source 300 may enclose the perimeter of the scanning window 404 in a plane that is inclined at an angle with the optical axis of the imaging apparatus 200. The positioning of the piped illuminator 300 may be determined such that illumination from the piped illuminator does not directly reach the image sensors 406. At the same time, the illumination from the piped illuminator 300 may fill an entirety of the region of the near field of view that lies within a threshold distance from the scanning window 404.

FIG. 5A illustrates a visualization of field of view and illumination in near field of an example indicia reading device, in accordance with at least one example embodiment of the present disclosure. FIG. 5A is described in conjunction with FIGS. 1A-4B. An example indicia reading device 500 comprises a housing 502 similar to the housing 402 of FIGS. 4A and 4B. Within the housing a recess may be built to include a scanning window 504 and accommodate an image sensor 506 having a field of view 508. The scanning window 504 may be similar to the scanning window 404 discussed with reference to FIGS. 4A and 4B. The piped illuminator 300 may be provided across a perimeter of the scanning window 404 such that the piped illuminator remains covered on two longitudinal sides and remains exposed on two lateral sides. That is, the piped illuminator 300 remains exposed on the top and bottom sides while being covered and held on the left and right sides. In such a configuration, the piped illuminator is configured to emit light only in the upward and downward directions. Owing to the partitioning of the interior of the piped illuminator 300 by the base substrate 306, light can be controlled to be emitted in a particular direction as per requirement. In some example embodiments, the piped illuminator 300 may be provided as a standalone illumination source to provide illumination along a direction that is substantially parallel to the front face of the scanner. In this regard, an inclination of the substrate 306 on which the one or more light elements 302, 304 may be mounted, is set in accordance with the desired illumination direction. Additionally or alternately, the one or more light elements 302, 304 may be mounted inclined on the substrate 306 to achieve illumination in a direction substantially parallel to the front face of the device.

The scanning window sits inside a recessed portion on the front face of the indicia reading device 500. That is, the front face of the indicia reading device 500 has a depression in the region that houses the optical assembly comprising the scanning window 504 and the image sensor 506. Since the piped illuminator 300 is positioned above the depression housing the optical assembly, direct light from the lower portion 308B of the piped illuminator 300 is prevented from entering the region behind the scanning window 504 as is indicated by the peripheral light ray AC in FIG. 5A. Also, since the piped illuminator 300 is exposed to the field of view 508, the lower portion 308B of the piped light source 300 is capable of illuminating a region of the field of view 508. Thus, the illumination cone ABC of the piped illuminator 300 intersects at least a portion of the field of view 508 that lies within a close distance from the scanning window 504. Accordingly, the piped illuminator 300 can provide illumination to regions in the near field of view of the indicia reading device 500 that would otherwise have been un-illuminated from a conventional illuminator. FIG. 5B comparatively illustrates illumination of a conventional illuminator and illumination of the piped illuminator 300 of the indicia reading device 500A. Illumination cone A'B'C' corresponds to the portion of the field of view illuminated by a conventional illuminator while illumination cone ABC corresponds to the portion of the field of view illuminated by the piped illuminator 300. As is illustrated, the illumination cone A'B'C' does not overlap with a portion of the field of view lying close to the scanning face of the indicia reading device 500. The illumination cone ABC produced by the illuminator 300 however clearly illuminated the portion lying close to the scanning face of the indicia reading device 500. This results in effectively capturing the indicia on the indicia label 510 by the image sensor 506 even in scenarios where the indicia label 510 is placed or passes close to the scanning face of the indicia reading device 500. Consequently, there remains no requirement to perform recapture of the images of the indicia label to perform a successful decoding.

In this way, an indicia label 510 that may lie very close to the scanning window 504 can also be illuminated to a substantial extent to allow effective image capture which results in quick and effective decoding of an information indicia.

The upper portion of the piped light source 300 may emit light to indicate successful completion of one or more image capture events. For example, while decoding the indicia on the indicia label 510, the indicia reading device 500 is required to be substantially align with the indicia label 510 so that it is within focus. The image sensor 506 may dynamically capture an image of the scene to identify whether the indicia label is aligned with for example an aimer projection. If yes, a controller of the indicia reading device 500 may control the piped illuminator to emit an indication illumination by lighting up the light elements corresponding to the upper portion 308A of the indicia reading device 500. Other forms of feedbacks as discussed with reference to FIG. 1B may also be incorporated. Thus, the example indicia reading device 500 illustrated in FIG. 5 provides a dual-purpose illuminator 300 that brings significant advantages in terms of image capture and indicia reading.

It may be contemplated that the piped illuminator may be used as the sole illumination source for the image sensor or as an additional illuminator specifically targeted at illuminating the region close to the scanning window in an imaging apparatus such as the indicia reading device 500. In this regard, the imaging apparatus may have multiple other variations to support different imaging capabilities.

FIG. 6 illustrates a flowchart depicting example operations of imaging process 600, in accordance with an example embodiment of the present disclosure. Process 600 may be implemented by the imaging system 10 or imaging apparatus 200 described with reference to FIG. 1A and FIG. 2. It should be understood that one or more steps of the process 600 may be executed in sequence or simultaneously unless specified otherwise. The process 600 includes at 602, controlling a piped light source of the imaging apparatus to produce a first illumination along a first direction extending towards a scene. The piped light source may be similar to the piped illuminator 300 which produces illumination in the near field of view region of the imaging apparatus. In some example embodiments, the piped light source may be the sole illuminator, or an additional illuminator specifically used for near field imaging. As such, the piped light source may be illuminated solely, jointly or in sequence with the primary illumination source. In some example embodiments, the primary illumination source may be a conventional illuminator described with reference to FIG. 5B. In some example embodiments, step 602 may be executed anytime during an image capture process to provide illumination required for a successful image capture. In some example embodiments, the illumination of the piped light source at step 602 may also be accompanied by illumination of another illuminator, for example, a conventional illuminator. A suitable controlling element such as the controller 20 may execute step 602 in collaboration with the piped light source. In some example embodiments, step 602 may be triggered in response to receipt of a trigger signal by the controller 20. For example, the controller 20 may receive a trigger signal from an activation component that indicates initiation of image capture by the imaging apparatus. In response, the controller executes step 602 to illuminate the scene with an illumination from the piped light source. In some example embodiments, step 602 may be executed by default when the imaging device is turned on without the need for a trigger signal.

The process 600 further includes at 604, obtaining from an image sensor of the imaging apparatus, a first image of the scene. The illuminated scene is next captured by the image sensor and a first image of the scene is obtained. The process 600 further includes at 606, detecting a subject in the first image. In this regard, a controller of the imaging apparatus such as controller 20 may perform image processing on the captured first image of the scene to identify a subject in the first image. Suitable image processing techniques such as pattern matching may be utilized towards this end.

The process 600 further includes at 608, determining that the subject in the first image is aligned with a pattern. The imaging apparatus may produce a pattern projection onto the scene prior to capturing the first image. The projected pattern may be captured as a part of the scene in the first image and the controller 20 after detecting a subject in the first image may determine whether the subject is aligned with the projected pattern or not. In example embodiments where the imaging apparatus is used in or as an indicia reading device, the subject may be an information indicia. As such, it is important that the subject and the device are aligned properly before decoding is performed. If the two are aligned properly, a feedback in this regard may be provided by activating the piped light source to produce a second illumination. The process 600 at 610 includes in response to determining that the subject is aligned with the pattern, controlling the piped light source to produce a second illumination along a second direction different from the first direction. If the subject and the pattern are not aligned, a negative feedback may be provided by producing an illumination of a different type that the first and second illumination. Such a negative feedback may as well be provided by the piped light source.

In some example embodiments, the method 600 may encompass additional steps that are not illustrated in FIG. 6. For example, as a part of an adaptive process the method 600 may include controlling brightness of the scene to be imaged as per the requirement, Towards this end, the controller may control the piped light source to produce the first illumination at a first brightness level and capture using the image sensor a second image of the scene. Next the controller may perform image analysis to determine if the second image satisfies one or more imaging conditions. For example, it may be determined if the first brightness is too high or too low for successful image capture. The controller may perform a pixel to pixel analysis on the second image to determine the brightness level of the pixels of the image.

If the controller determines that the second image failed to satisfy one or more imaging conditions, the controller may control the piped light source to produce the first illumination at a second brightness level. The second brightness level may be higher or lower than the first brightness level depending on the outcome of the pixel analysis. The above-mentioned adaptive process may be repeated for a set number of times until the second image satisfies all or most of the one or more imaging conditions. In this regard, it may be predefined which conditions may be essential and which of them may be non-essential depending on needs of the decoding process. If the adaptive process is repeated for a predefined number of times and the second image still does not satisfy the one or more conditions, the controller may determine if the last captured second image satisfies at least one essential imaging condition for the decoding process to be successful. If yes, then the controller proceeds ahead with that version of the second image. If not, the controller terminates the process.

Having set the optimum brightness, the controller may next obtain a third image of the scene illuminated with the first illumination at the second brightness level. In case the optimum brightness cannot be set, the controller either terminates the process or proceeds with the last version of the second image in a manner as discussed above. When the third image is made available to the controller, the controller next processes the third image to attempt decoding an indicia in the third image. If the indicia is decodable, the controller decodes it and a second illumination is produced by the piped light source in response to the successful decoding. However, if the indicia is not decodable, a negative feedback may be provided through the piped light source.

In this way, example embodiments described herein provide methods and machines for providing a dual illumination in a piped light source. The piped light source serves a dual purpose of providing illumination in the near field of view and well as serving as an indicator for relaying feedbacks pertaining to image capture events. An imaging device having such a piped illuminator will eventually capture images in a wide range of distances from the imaging apparatus. Thus, the imaging apparatus will find application in areas where a close scan is required such as in retail stores and checkout counters. Other advantages such as reduced number of recapture attempts fasten up the overall image capture and indicia decoding process. Thus, example embodiments of the present invention reflect significant advantages in an imaging apparatus and method.

It will be understood that each block of the flowchart and combination of blocks in the flowchart illustrated above in FIG. 6 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the imaging apparatus/system. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions/operations. It will also be understood that one or more blocks of the flowcharts, and combinations of blocks in the flowcharts, can be implemented by special purpose hardware-based computer systems which perform the specified functions, or combinations of special purpose hardware and computer instructions.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code).

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An imaging method for an imaging apparatus, comprising:
   controlling a light source of the imaging apparatus to produce a first illumination along a first direction extending towards a scene, wherein the first illumination illuminates the scene such that an illumination cone of the light source overlaps a portion of a near field of view cone of the imaging apparatus, wherein the portion of the near field of view cone extends from a surface of an optical window of the imaging apparatus to a threshold distance from the optical window;

projecting an aimer pattern within the near field of view of the imaging apparatus;

obtaining, from an image sensor of the imaging apparatus, a first image of the scene;

detecting a subject in the first image;

determining whether the subject in the first image is aligned with the aimer pattern; and in response to determining that the subject is aligned with the aimer pattern in the first image, controlling the light source to produce a second illumination along a second direction different from the first direction.

2. The imaging method of claim 1, further comprising:
controlling the light source to produce the first illumination at a first brightness level;
obtaining, from the image sensor, a second image of the scene;
processing the second image to determine if the second image satisfies one or more imaging conditions; and
controlling the light source to produce the first illumination at a second brightness level based on the second image failing to satisfy the one or more imaging conditions.

3. The imaging method of claim 1, further comprising:
obtaining from the image sensor, a third image of the scene illuminated with the first illumination at a second brightness level;
processing the third image to decode a decodable indicia in the third image; and
controlling the light source to produce the second illumination based on the decoded decodable indicia.

4. The imaging method of claim 1, wherein the second illumination provides a feedback for correctly aligning the subject with the aimer pattern in the first image.

5. An indicia reading device, comprising:
an imager configured to capture an image of a scan label;
a scanning window positioned in front of the imager, wherein the scanning window is configured to transmit incident light to the imager;
an illuminator enclosing a perimeter of the scanning window such that an illumination cone of the illuminator overlaps a portion of a near field of view cone of the indicia reading device, wherein the portion of the near field of view cone extends from a surface of the scanning window to a threshold distance from the scanning window; and
a controller configured to:
control the illuminator to produce a first illumination, in a first direction, to illuminate the scan label;
project an aimer pattern on the scan label;
obtain the image of the scan label from the imager;
determine whether the scan label is aligned with the aimer pattern; and
in response to determining that the scan label is aligned with the aimer pattern in the image, control the illuminator to produce a second illumination along a second direction different from the first direction, wherein the second illumination provides a feedback for correctly aligning the scan label with the aimer pattern in the image.

6. The indicia reading device of claim 5, wherein the illuminator has a ringed structure that encloses the perimeter of the scanning window in a plane inclined at an angle with an optical axis of the indicia reading device.

7. The indicia reading device of claim 5, wherein the first illumination illuminates an entirety of the portion of the near field of view cone of the indicia reading device.

8. The indicia reading device of claim 5, wherein the illuminator is configured to:
produce the first illumination along the first direction extending towards the scan label; and
produce the second illumination along the second direction orthogonal to the first direction.

9. The indicia reading device of claim 5, wherein the second illumination is of a different wavelength than the first illumination.

10. The indicia reading device of claim 5, wherein the second illumination provides a second feedback for correctly aligning a subject with the aimer pattern in the first image.

11. An imaging apparatus comprising:
an image sensor configured to capture a first image of a scene;
an optical window positioned in front of the image sensor, wherein the optical window is configured to transmit an incident light to the image sensor;
an aimer configured to project an aimer pattern on a scan label;
a first light source, positioned on a base substrate, enclosing a perimeter of the optical window such that an illumination cone of the first light source overlaps a portion of a near field of view cone of the imaging apparatus; and
a second light source, positioned on the base substrate, illuminating in a second direction different from a first direction of the first light source in response to the scan label being aligned with the aimer pattern in the first image,
wherein the second light source acts as an indication ring that illuminates upon completion of a successful event.

12. The imaging apparatus of claim 11, wherein the first light source has a ringed structure that encloses the perimeter of a scanning window in a plane inclined at an angle with an optical axis of the imaging apparatus.

13. The imaging apparatus of claim 11, wherein the first light source illuminates an entirety of the portion of the near field of view cone of the imaging apparatus.

14. The imaging apparatus of claim 11, wherein the first light source is configured to produce a first illumination along the first direction extending towards the scan label.

15. The imaging apparatus of claim 11, wherein a first illumination generated by the first light source has a different wavelength than a second illumination generated by the second light source.

* * * * *